United States Patent [19]

Striffler

[11] Patent Number: 5,654,937
[45] Date of Patent: Aug. 5, 1997

[54] ACOUSTIC ELEMENT TESTER FOR AN ARRAY OF HYDROPHONES

[75] Inventor: Foster L. Striffler, New London, Conn.

[73] Assignee: The United States of America as represented by the Secretary of the Navy, Washington, D.C.

[21] Appl. No.: 624,835

[22] Filed: Mar. 22, 1996

[51] Int. Cl.$^6$ ................................................ H04B 17/00
[52] U.S. Cl. .............................................................. 367/13
[58] Field of Search ............................... 367/13; 73/1 DV

[56] References Cited

U.S. PATENT DOCUMENTS

| | | | |
|---|---|---|---|
| 4,205,394 | 5/1980 | Pickens | 367/13 |
| 4,223,397 | 9/1980 | Bakewell, Jr. et al. | 367/13 |
| 4,290,123 | 9/1981 | Pickens | 367/13 |
| 4,320,468 | 3/1982 | Montross | 367/13 |
| 4,353,120 | 10/1982 | Pickens | 367/13 |
| 4,375,679 | 3/1983 | Park, Jr. et al. | 367/13 |
| 5,210,718 | 5/1993 | Bjelland et al. | 367/13 |

*Primary Examiner*—Daniel T. Pihulic
*Attorney, Agent, or Firm*—Michael J. McGowan; William F. Eipert; Prithvi C. Lall

[57] ABSTRACT

An apparatus for testing an individual hydrophone element in an axially extending hydrophone array includes a pressure wave generator, an insonifier for directing the generated pressure waves toward a selected one of the elements of the array and a monitor for measuring the output of the array responsive to the generated arrays. The pressure wave generator is isolated so it does not produce pressure waves externally thereto. The insonifier includes a housing with an axially extending through aperture for receiving the array and a chamber formed in the housing with a first port connecting with the pressure wave generator and a second port connecting with the axially extending aperture so that the generated pressure waves insonify a selected one of the hydrophone elements disposed proximate the second port. The monitor enables the user to check the wiring of each of the elements for proper phase alignment of the elements and to test the sensitivity of each of the elements as they correspond to the input pressure waves.

20 Claims, 2 Drawing Sheets

ACOUSTIC ELEMENT TESTER FOR AN ARRAY OF HYDROPHONES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

This invention relates to a method and apparatus for testing an array of detectors and more particularly to a method and apparatus for testing individual ones of a plurality of hydrophone elements defining a hydrophone array.

(2) Description of the Prior Art

The gathering of data in an acoustic environment by means of an array of electrically interconnected hydrophone elements is of increasing importance, both for commercial and military purposes. Such arrays are usually linear and comprise a number of hydrophone elements distributed over a length in a linear array. In some applications, the arrays are two dimensional. In order for improved interpretation of information from any of these arrays it is important that the signals generated by each hydrophone element be in phase and preferably be within a given range of sensitivity. Consequently various means for testing hydrophone arrays have been developed with the following United States Letters Patent disclosing representative techniques and devices.

U.S. Pat. No. 4,205,394 to Pickens discloses a sealed cavity for containing a fluid, an acoustic projector, a reference hydrophone element and a hydrophone array to be tested. The reference hydrophone and the hydrophone array under test generate signals received by monitoring equipment responsive to the output of the acoustic projector. The monitoring equipment enables comparison between the responses of the reference hydrophone and the tested hydrophone array so as to evaluate the performance and polarity of the hydrophone array generally.

U.S. Pat. No. 4,223,397 to Bakewell, Jr. et al. discloses a device for use in a laboratory fluid tank that includes a tubular chamber through which a hydrophonic array extends. Fluid is directed through an inlet in the chamber to exit a port thereof. A turbulent flow is thereby attained as the fluid exits the chamber to enable monitoring of response of individual hydrophone elements to the turbulent flow.

U.S. Pat. No. 4,290,123 to Pickens discloses a device for travelling along a towed linear hydrophone array. The device includes an acoustic projector comprising a plurality of elements on a circular wall of a frame. The acoustic projector emits test signals as it moves along the towed array past individual hydrophone elements. A monitoring device connected to the hydrophone array provides information concerning the polarity at the center of an individual hydrophone element and other information used for calibration.

U.S. Pat. No. 4,320,468 to Montross discloses an apparatus and method for testing hydrophone elements mounted one to two feet apart in a linear array. The tester applies a repeatable low-level pressure pulse to individual hydrophone elements mounted in the array that constitutes a marine seismic streamer cable. More specifically, a solenoid when energized drives a plunger to impact the cable and produces a detectable pressure pulse. The hydrophone element at the solenoid generates a responsive signal. Successive signals from the individual elements due to moving the tester along the cable enable comparison of the amplitude, polarity and frequency of the signals.

U.S. Pat. No. 4,353,120 to Pickens discloses a pressure generator apparatus for insonifying selective portions of an elongated array of hydrophone elements. The apparatus comprises an elongated tube with reciprocating pistons disposed therein. Flexible caps at the ends of the tubes transmit the pressure waves generated by the pistons to a fluid medium in which the tube is maintained. The generator apparatus is preferably supported by a travelling cart, such as disclosed in the above-identified U.S. Pat. No. 4,290,123.

U.S. Pat. No. 4,375,679 to Park, Jr. et al. discloses a method and apparatus for testing hydrophone elements in a seismic streamer cable. The apparatus comprises an irregularly shaped chamber for being clamped to a portion of a seismic cable. A loudspeaker disposed on the chamber produces pressure waves that are directed into the chamber. The apparatus also includes a reference hydrophone element located in the chamber. Comparing signals from the hydrophone element under test and the reference hydrophone element enables an analysis of the polarity and sensitivity of the hydrophone element under test.

U.S. Pat. No. 5,210,718 to Bjelland et al. discloses a method for calibrating groups of hydrophone elements using a Helmholtz resonator. The hydrophonic groups or sections of a hydrophonic group are placed in the resonator's cavity and connected to a signal analyzer. The response of the hydrophonic groups or sections are compared to a reference hydrophone element within the cavity upon generation of pressure waves that strike the hydrophone elements. The output and the relative polarity of the hydrophone elements can be then analyzed by comparing the responses to those from the reference hydrophone element.

Thus, the prior art discloses a variety of apparatus and methods for calibration testing and other evaluations of hydrophone elements arranged to define a hydrophone array. However, many are not suited to manufacturing facilities. Many of the devices require testing in a fluid medium. Others require a reference hydrophone element; during testing the characteristics of such reference hydrophone elements can change with temperature, use and age. Still others of the references fail to account for generation of unwanted signals in other closely spaced hydrophone elements. That is, the references fail to provide a simple, easy to use device for readily determining the correct wiring of each individual hydrophone element in a hydrophone array.

SUMMARY OF THE INVENTION

It is therefore an object of this invention to provide a testing device for testing the individual hydrophone elements of a hydrophonic array.

It is another objection of this invention to provide a method and apparatus for selectively exciting an individual hydrophone element in an array for testing each of the individual hydrophone elements.

It is yet still another object of this invention to provide a method and apparatus for reducing the background noise normally encountered during the testing of hydrophone arrays.

In accordance with this invention an apparatus for testing elements of a hydrophone array includes a pressure wave generator, an insonifier for directing the generated pressure waves toward a selected one of the hydrophone elements in the array and a monitor for detecting the output of the array responsive to the generated pressure waves. The insonifier includes a housing with an axially extending passage for receiving the array therethrough and a chamber formed in the housing having a first port connecting with the pressure means and a second port connecting with the axially extending aperture to insonify the selected element of the array. By insonify it is meant to generate a sound field substantially surrounding the selected element.

In accordance with another aspect of this invention a test apparatus for testing a selected element in a linear array of hydrophone elements includes a pressure wave generator that generates pressure waves and an isolator that isolates the pressure wave generator. An insonifier connects with a port in the isolator and directs the generated pressure waves to the selected one of the elements.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
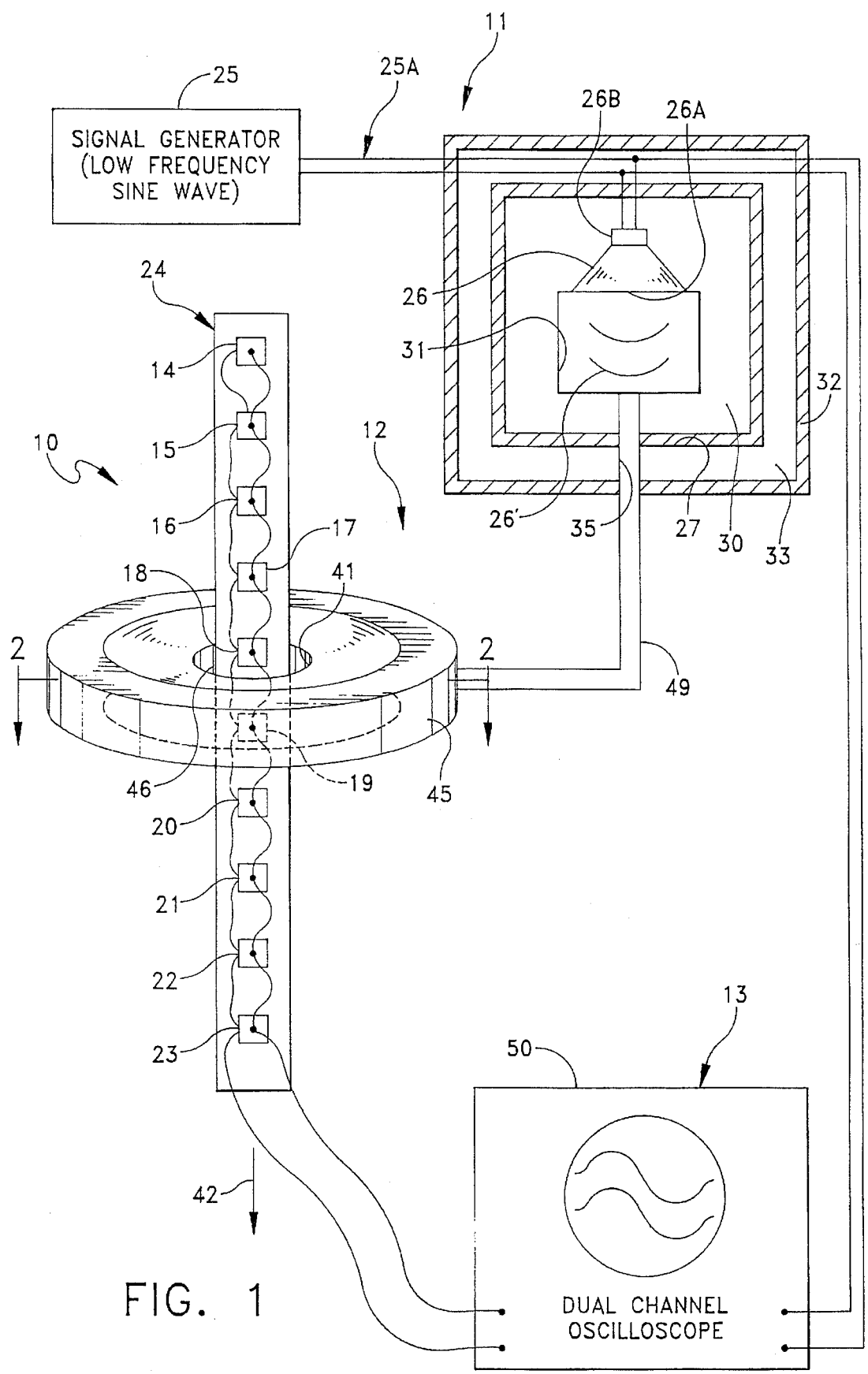
FIG. 1 is a diagrammatic view of an apparatus for testing individual elements of an axially extending array of hydrophones according to this invention.

Referring now to FIG. 1 a testing apparatus 10 according to this invention includes a pressure generating sub-system 11, an insonifier sub-system 12 and a monitoring sub-system 13. The pressure generating sub-system 11 generates pressure waves that are directed by the insonifier sub-system to excite individual hydrophone elements 14 through 23 in a linear hydrophone array 24. The array 24 and the pressure generating sub-system 11 connect electrically to the monitoring sub-system 13. The monitoring sub-system 13 compares the amplitude and phase of signals from the array 24 with the signals driving the pressure generating sub-system 11. The signal from the array 24 comprises substantially the signal generated by the individual one of the hydrophone elements 14 through 23 that aligns with the insonifier sub-system 12.

In this embodiment, the pressure sub-system 11 comprises a signal generator 25 of a known type that preferably generates a low frequency sine wave output signal 25A. The output signal 25A drives a loudspeaker 26 and is an input to the monitoring sub-system 13. The loudspeaker 26 is disposed in a pressure wave chamber 31 defined within a sound insulating material 30. A first enclosure box 27 surrounds the insulating material 30. Sound insulating material 33 overlies the first enclosure box 27 with a second sound enclosure box 32 overlying the sound insulating material 33. A pressure wave port 35 extends from the pressure wave chamber 31 through the insulation material 30 and 33 and the first and second enclosure boxes 27 and 32 for passing pressure waves 26' generated by the loudspeaker 26 in response to the output signals 25A out of the chamber 31. The first and second enclosure boxes 27 and the sound insulating material 30 and 33 act as a isolation device and limit pressure waves emitted from a rear portion 26B and the forward portion 26A of the loudspeaker 26 from passing to any of the elements 14 through 23 except through the pressure wave port 35.

Figure 2:
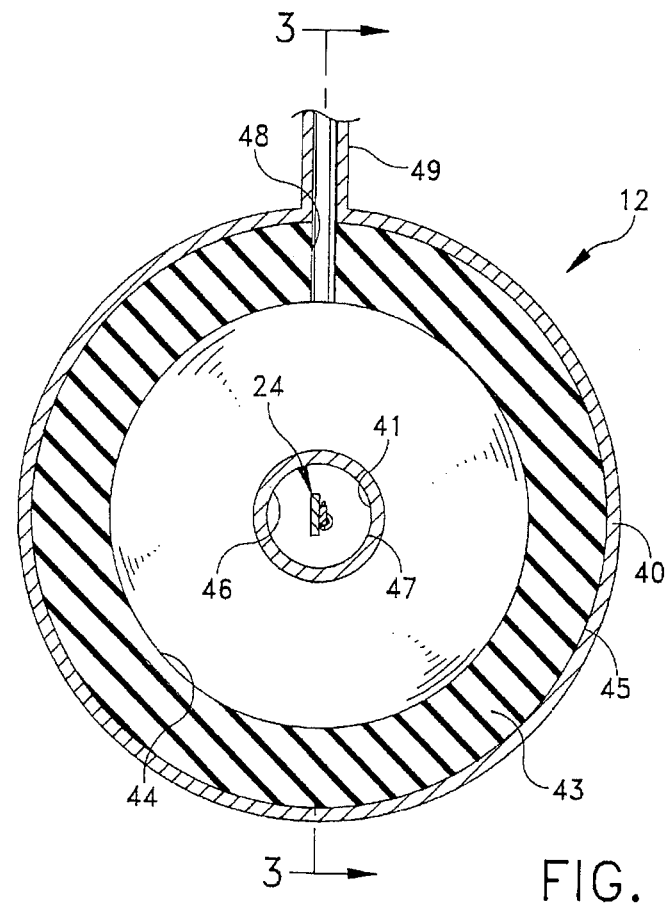
FIG. 2 is a sectional view of an insonifier taken along the section line 2—2 of FIG. 1.
Figure 3:
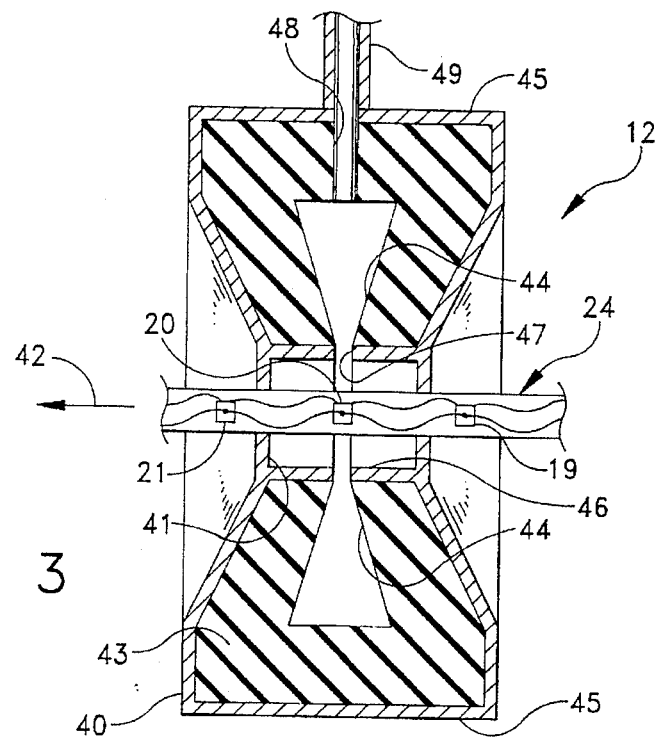
FIG. 3 is a sectional view of the insonifier taken along the section line 3—3 of FIG. 2.

Referring now to FIGS. 2 and 3, the insonifier sub-system 12 includes a ring-shaped housing 40 that includes a central through aperture 41 extending along an axis 42. The aperture 41 constitutes an axial passage for the array 24. The cylindrical housing 40 includes an outer wall structure 45 overlying insulating material 43, which, as seen in FIG. 3, surrounds an annular, axially extending pressure chamber 44. The pressure chamber 44 has a maximum thickness or width in the axial direction proximate the outer annular wall 45 of the cylindrical housing 40. This thickness increasingly narrows to a minimum at an end defined by an axially extending, annular wall 46 that also defines the aperture 41. Thus in this embodiment the chamber 44 has a regular trapezoidal shape. This feature concentrates or focuses the pressure waves 26' entering the chamber from a port 48 toward an annular slot 47 that constitutes a path from the chamber 44 to the aperture 41. The slot 47 as depicted in FIG. 3 is relatively small and preferably extends in the axial direction a distance less than the distance between adjacent detectors such as detectors 19 and 20. That is, it is preferred that the axial dimension of the slot 47 be approximately one half the given distance between adjacent detectors, and may even be less than one quarter the given distance for some applications.

As depicted, in FIGS. 1 and 3 a conduit 49 connects the port 48 with the pressure wave chamber 31 to convey the pressure waves 26' to the chamber 44. Thus, the pressure waves 26' pass from the pressure wave chamber 44 where they are reflected and directed and then pass through the slot 47 to the volume defined by the annular wall 46. The insonifier sub-system 12 and the pressure generating sub-system 11 of this embodiment thus enable individual ones of the hydrophones 14 through 23 positioned proximate the slot 47 to be excited with adjacent ones of the hydrophones remaining substantially unaffected.

The monitoring sub-system 13 as illustrated in FIG. 1 receives the output signals 25A and receives any responsive signals generated by the array 24. In one embodiment the monitoring sub-system comprises a dual-channel oscilloscope 50 that displays the phase and amplitude of the signals generated by the array responsive to the pressure waves 26' as individual hydrophones 14 through 23 are moved proximate the slot 47. In this manner the user can check the amplitude and phase of the signals generated by the individual hydrophones 14 through 23 by monitoring the signals generated by the array 24.

The oscilloscope 50 thus enables the user to compare the generated signals of the signal generator 25 with those of the individual hydrophones 14 through 23. These comparisons enable the user to determine the phase of the generated signal relative to the reference signal. Comparing the generated signals of the hydrophones 14 through 23 in the array 24 enables a determination of whether any element is improperly wired. The user may also compare the output signal to determine the relative sensitivity of the individual hydrophone elements 14 through 23. Those skilled in the art will appreciate that other known phase comparator apparatus can readily be substituted for the oscilloscope 50.

A prototype of the cylindrical housing 40 of the insonifier sub-system 12 has been constructed of wood with the chamber 44 having a toroidial shape. Although housing 40 can be made of wood, in a preferred embodiment the housing is made of a material having a high acoustic impedance such as brass. The conduit 49 preferably formed of a soft plastic material such as that available under the trademark Tygon or the like with a high mechanical loss factor that does not radiate the pressure waves through its outer walls. The conduit 48 connects the pressure generating sub-system 11 with a cylindrical housing 40. In one particular application the hydrophone elements of the hydrophone array 24 to be tested are approximately 0.25" apart, so the slot 47 had an opening of approximately 0.125" in the axial direction 42.

Provided that the slot 47 directs the sound to a sufficiently narrow region in which a single hydrophone element, such as the hydrophone element 19, is positioned, the signal from the array 24 will directly correspond with the signal from the individual hydrophone because the pressure waves at adjacent hydrophones are not sufficient to generate a significant response. Specifically, the sound pressure levels in the volume defined by the aperture 41 fall off as the square of the power of the distance from the slot 47. The "narrowness" of the slot 47 allows the pressure waves 26' passing from the chamber 44 through the slot 47 to be concentrated at a restricted portion of the volume defined by the aperture 41. Thus the signal generated by the array 24 will be from an individual element such as the element 19 as depicted in FIG. 3.

The foregoing embodiment of this invention provides apparatus that acoustically isolates the loudspeaker 26, dampens radiating pressure waves from the conduit 48, and transmits a pressure wave over a limited area localized to a single hydrophone in a hydrophone array. This enables excitation of one hydrophone element independently of others of the adjacent hydrophone elements. Consequently a signal generated by the array 24 can be considered as being solely responsive to the individually excited hydrophone. The monitoring sub-system 13 as depicted in FIG. 1 is preferably a dual channel oscilloscope 50 that connects both with the array 24 and the signal generator 25.

This invention has been disclosed in terms of particular embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. An apparatus for insonifying elements of an axially extending array of electrically connected individual hydrophone elements comprising:
   a housing with an axially extending passage for receiving the array therethrough; and
   a chamber formed in said housing having a first port means for receiving pressure waves and a second port means connecting the chamber with the passage for directing the pressure waves toward a selected one of the hydrophone elements disposed proximate said second port means whereby a response signal generated by the array is substantially generated by the selected one of the hydrophone elements.

2. The apparatus of claim 1 wherein said second port comprises a slot circumscribing the passage.

3. The apparatus of claim 2 wherein the passage is cylindrical and formed by a inner annular wall, said housing further including an outer annular wall radially spaced from said inner annular wall and opposed, spaced walls connecting said first and second annular walls.

4. The apparatus of claim 3 additionally comprising sound insulating material intermediate said housing and chamber.

5. The apparatus of claim 4 wherein said chamber is symmetrically formed in said housing with a decreasing axial width extending from proximate said outer annular wall to said inner annular wall.

6. The apparatus of claim 3 wherein said slot extends in the axial direction less than one half the given distance.

7. The apparatus of claim 3 wherein said chamber in axial cross-section has a regular trapezoidal shape.

8. The apparatus of claim 3 wherein said first port is formed in said outer annular wall and said chamber is substantially symmetrically formed about the axis with an axial width that increases from said slot to said first port.

9. The apparatus of claim 1 wherein said slot extends in the axial direction less than one half the given distance.

10. An apparatus for testing a selected element in an array of hydrophone elements comprising:
    pressure wave means for generating pressure waves;
    isolating means encompassing said pressure wave means, said isolating means having a port therefrom;
    insonifying means for directing the generated pressure waves received from the port of said isolating means to a selected one of the elements; and
    means for measuring the signals from the array in response to the pressure waves directed at the selected one of the elements.

11. An apparatus as recited in claim 10 wherein said pressure wave means includes a loudspeaker coupled to a signal generator, said loudspeaker being responsive to said signal generator to generate said pressure waves.

12. A testing apparatus as recited in claim 11 wherein said insonifier includes:
    a housing with an axially extending through passage for receiving the array therethrough; and
    a chamber defined in said housing with a second port connecting with said first port and a third port connecting with said passage whereby pressure waves generated by said pressure wave means pass to the selected element.

13. A testing apparatus as recited in claim 12 wherein said insonifying means further includes a soft plastic tube connecting said second port with said first port of said isolating means.

14. A testing apparatus as recited in claim 13 wherein said isolating means includes:
    an outer housing with sound insulated inner walls; and
    an inner housing received in said outer housing, said inner housing having sound insulating walls defining a pressure wave chamber housing said loudspeaker.

15. An apparatus as recited in claim 11 wherein said isolating means includes:
    an outer housing with sound insulating inner walls; and
    an inner housing received in said outer housing, said inner housing having sound insulating walls defining a pressure wave chamber housing said loudspeaker.

16. An apparatus as recited in claim 10 wherein said insonifier includes:
    a housing with an axially extending through passage for receiving the array therethrough; and
    a chamber defined in said housing with a second port connecting with said insonifying means and a third port connecting with said passage.

17. An apparatus as recited in claim 16 wherein said insonifying means further includes a soft plastic tube connecting said second port with said first port of said isolating means.

18. An apparatus as recited in claim 10 wherein said insonifying means includes a soft plastic tube connecting said port and said insonifying means.

19. An apparatus as recited in claim 10 wherein said isolating means includes an outer housing with sound insulating inner walls and an inner housing received in said outer housing with said inner housing having sound insulating walls defining a pressure wave chamber.

20. An apparatus as recited in claim 19 wherein said pressure wave means includes a loudspeaker disposed in said pressure wave chamber.

* * * * *